United States Patent
Dolev et al.

(10) Patent No.: US 9,413,528 B2
(45) Date of Patent: Aug. 9, 2016

(54) METHOD FOR ATTRIBUTE BASED BROADCAST ENCRYPTION WITH PERMANENT REVOCATION

(75) Inventors: Shlomi Dolev, Omer (IL); Niv Gilboa, Tel Aviv (IL); Marina Kopeetsky, Ashdod (IL)

(73) Assignee: Ben-Gurion University of the Negev Research and Development Authority, Beer Sheva (IL)

( * ) Notice: Subject to any disclaimer, the term of this patent is extended or adjusted under 35 U.S.C. 154(b) by 124 days.

(21) Appl. No.: 14/239,580

(22) PCT Filed: Aug. 22, 2012

(86) PCT No.: PCT/IL2012/000315
§ 371 (c)(1),
(2), (4) Date: Feb. 19, 2014

(87) PCT Pub. No.: WO2013/027206
PCT Pub. Date: Feb. 28, 2013

(65) Prior Publication Data
US 2014/0226816 A1 Aug. 14, 2014

Related U.S. Application Data

(60) Provisional application No. 61/526,712, filed on Aug. 24, 2011.

(51) Int. Cl.
| | | |
|---|---|---|
| H04L 9/08 | (2006.01) | |
| H04N 21/2347 | (2011.01) | |
| H04N 21/266 | (2011.01) | |
| H04N 21/4405 | (2011.01) | |
| H04N 21/4623 | (2011.01) | |
| H04L 9/30 | (2006.01) | |

(52) U.S. Cl.
CPC .............. *H04L 9/0816* (2013.01); *H04L 9/088* (2013.01); *H04L 9/0833* (2013.01); *H04L 9/0861* (2013.01); *H04L 9/0866* (2013.01); *H04L 9/0891* (2013.01); *H04L 9/3073* (2013.01); *H04N 21/2347* (2013.01); *H04N 21/26606* (2013.01); *H04N 21/4405* (2013.01); *H04N 21/4623* (2013.01); *H04L 2209/24* (2013.01); *H04L 2209/601* (2013.01)

(58) Field of Classification Search
CPC ....... H04L 9/0833; H04L 9/0836; H04L 9/08; H04L 9/0816; H04L 9/0852; H04L 9/0855; H04L 9/0861; H04L 9/0866; H04L 9/088; H04L 9/0891; H04L 9/3073; H04L 2209/24; H04L 2209/301; H04N 21/2347; H04N 21/26606; H04N 21/4405; H04N 21/4623
USPC ........................................................ 380/255
See application file for complete search history.

(56) References Cited

U.S. PATENT DOCUMENTS

| | | | |
|---|---|---|---|
| 3,792,676 A | 2/1974 | Craft | |
| 4,457,248 A | 7/1984 | Thurston | |
| 6,305,306 B1 | 10/2001 | Grzybowski | |
| 8,837,738 B2 * | 9/2014 | Huang | H04L 9/0836 380/281 |
| 2008/0101611 A1 * | 5/2008 | Lindholm | H04L 9/0836 380/277 |
| 2011/0320809 A1 * | 12/2011 | Amendola | H04L 9/088 713/158 |
| 2012/0216739 A1 | 8/2012 | Mauer | |

FOREIGN PATENT DOCUMENTS

| | | |
|---|---|---|
| GB | 1074015 | 6/1967 |
| WO | 9840272 | 9/1998 |
| WO | 2011045723 A1 | 4/2011 |

OTHER PUBLICATIONS

Bethencourt et al., "Ciphertext-Policy Attribute-Based Encryption," Proceedings of the 28th IEEE Symposium on Security and Privacy (2007). http://web.cs.ucla.edu/~sahai/work/web/2007%20Publications/SSP2007.pdf.*
Hartono et al, Efficient Revocation Schemes for Secure Multicast, Dec. 7, 2001.
Yu et al., Data Sharing on Untrusted Storage . . . Encryption, Jul. 1, 2010.
Junod et al., An Efficient Public-Key Attribute-Based Broadcast . . . Policies, Oct. 4, 2010 =WO. EP:Jan. 1, 2010.
Obied; Broadcast Encryption, Apr. 22, 2005.
Bethencourt et al, Ciphertext-Policy Attribute-Based Encryption, May 23, 2007.
D. Boneh et al., "Collusion Resistant Broadcast Encryption With Short Ciphertexts and Private Keys", 25-th Annual International Cryptology Conference CRYPTO 2005, USA, 2005. In Lecture Notes in Computer Science, vol. 3621, pp. 258-275.
R. Canetti, J. Garay, G. Itkis, D. Micciancio, M. Naor, B. Pinkas, "Multicast Security: A Taxonomy and Some Efficient Constructions", INFOCOM'99, Eighteenth Annual Joint Conference of the IEEE Computer and Communications Societies, Proceedings, vol. 2, pp. 708-716, 1999.
R. Canetti, T. Malkin, K. Nissim, "Efficient Communication-Storage Tradeoffs for Multicast Encryption", EUROCRYPT'99, LNCS1592, pp. 459-474, 1999.

(Continued)

*Primary Examiner* — Jung Kim
*Assistant Examiner* — Ngoc D Nguyen
(74) *Attorney, Agent, or Firm* — Roach Brown McCarthy & Gruber, P.C.; Kevin D. McCarthy

(57) ABSTRACT

The invention is a method for broadcast encryption that allows a broadcaster to send encrypted data to a set of users such that only a subset of authorized users can decrypt said data. The method comprises modifications to the four stages of the basic Cipher-text Policy Attribute-Based Encryption techniques. The method can be adapted to transform any Attribute-Based Encryption scheme that supports only temporary revocation into a scheme that supports the permanent revocation of users.

2 Claims, No Drawings

(56) References Cited

OTHER PUBLICATIONS

L. Cheung, J. A. Cooley, R. Khazan, C. Newport, "Collusion Resistant Group Key Management Using Attribute Based Encryption", Cryptology ePrint Archive, Report 2007/161, 2007. Presented at GOCP 07.

L. Cheung, C. Newport, "Provably Secure Ciphertext Policy ABE", Proceedings of the 14th ACM conference on Computer and communications security (CCS), pp. 456-465, 2007.

C. Delerablee, P. Paillier, D. Pointcheval, "Fully Collusion Secure Dynamic Broadcast Encryption with Constant-Size Ciphertexts or Decryption Keys", Proceedings of the first International Conference on Pairing-based Cryptography, LNCS 4575, pp. 39-59, Springer-Verlag, Jul. 2007, Tokyo, Japan.

A. Fiat, M. Naor, "Broadcast Encryption". In Douglas R. Stinson, editor, published prior to 2010.

C. Gentry, B. Waters, "Adaptive Security in Broadcast Encryption Systems", In Eurocrypt, 2009.

H. Harney, E. Harder, "Logical Key Hierarchy Protocol", Internet Draft, Internet Engineering Task Force, Apr. 1999.

D. Halevy, A. Shamir, "The LSD Broadcast Encryption Scheme", CRYPTO 2002, LNCS 2442, pp. 47-60, 2002.

A. Lewko, A. Sahai, B. Waters, "Revocation Systems with Very Small Private Keys", In Security and Privacy, 2010.

D. Lubicz, T. Sirvent, "Attribute-Based Broadcast Encryption Scheme Made Efficient", In AFRICACRYPT, LNCS, vol. 5023, pp. 342-325, Jun. 11, 2008.

D. Naor, M. Naor, J. Lotspiech, "Revocation and Tracing Schemes for Stateless Receivers", CRYPTO 2001, LNCS, vol. 2139, pp. 41-62, 2001.

A. Perrig, D. Song, J. D. Tygar, "ELK, a New protocol for Efficient Large-Group Key Distribution", IEEE Symposium on Security and Privacy 2001, Proceedings, pp. 247-262, 2001.

McGrew et al., "Key Establishment in Large Dynamic Groups using One-Way Function Trees", IEEE Transactions on Software Engineering, No. 29, vol. 5, pp. 444-458, 2003.

A. Sahai, B. Waters, "Fuzzy Identity Based Encryption", Advances in Cryptology-Eurocrypt, vol. LNCS 3494, pp. 457-473, Springer, 2005.

C. K. Wong, M. Gouda, S. Lam, "Secure Group Communications Using Key Graphs", IEEE/ACM Transactions on Networking, vol. 8, No. 1, Feb. 2000.

Bethencourt et al., "Ciphertext-Policy Attribute-Based Encryption . . . and provably secure realization" url:https://:eprint.iacr.org/2008/290.pdf on May 28, 2015.

Alexandra Boldyreva et al: Identity based encryption with efficient revocation 15th ACM Conference on computer . . . Jan. 1, 2008 p. 417 NYC, NY, USA.

Dolev et al., Attribute Based Broadcast Encryption with Permanent Revocation, presumed to be published prior to the filed of this application.

Lecture Notes in Computer Science—Advances in cryptology: proceedings/ EUROCRYPT '99,—International Conference on the Theory and application of Cryptographic Technigues—32 articles—ed. Goos et al. May 1999.

Notification concerning transmittal of copy of international preliminary report on patentability and written opinion of the international searching authority for a counterpart foreign application—PCT/IL2012/000315, mailed Mar. 6, 2014, 4 pages.

Kurnio et al., Efficient Revocation Schemes for Secure Multicast; K. Kim (Ed.): ICICS 2001, LNCS 2288, pp. 160-177, 2002.

International search report for a counterpart foreign application—PCT/IL2014/050542, mailed Oct. 1, 2014, 4 pages.

Written Opinion of the International Searching Authority for a counterpart foreign application—PCT/IL2014/050542, mailed Oct. 1, 2014, 6 pages.

Waters, "Ciphertext-Policy Attribute-Based Encryption: An Expressive, Efficient, and Provably Secure Realization" (2011).

Supplementary European search report for a counterpart foreign application—12825071.9—Jun. 8, 2015.

International search report for a counterpart foreign application—PCT/IL2012/000315, mailed Dec. 26, 2012, 5 pages.

Written Opinion of the International Searching Authority for a counterpart foreign application—PCT/IL2012/000315, mailed Dec. 26, 2012, 4 pages.

\* cited by examiner

METHOD FOR ATTRIBUTE BASED BROADCAST ENCRYPTION WITH PERMANENT REVOCATION

FIELD OF THE INVENTION

The invention relates to the field of computer communication networks. Specifically the invention relates to the field of broadcast encryption.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

The concept of broadcast encryption was first introduced in [8] and further developed in many works including [14], [11], [2], [9], [7] and [12]. Broadcast encryption systems allow a broadcaster to send encrypted data to a set of users such that only a subset RS of authorized users can decrypt the data. A main challenge in constructing broadcast systems is ensuring that, even when the users that are not in RS collude, it is computationally infeasible for unauthorized users to decrypt a message.

Broadcast encryption systems support temporary revocation of users if revoked users are excluded from the set RS for a single ciphertext. Typically, in such systems, the identities of the revoked users are parameters in the encryption mechanism.

Broadcast encryption systems support permanent revocation of users if revoked users cannot decrypt any ciphertext after the revocation. Permanent user revocation is efficiently implemented in symmetric encryption schemes (e.g. the third scheme of [7]). Temporary revocation is achieved by various schemes including [5] and the first two schemes of [7].

Broadcast encryption systems are either stateful or stateless. A stateful scheme requires receivers to store a state and update it based on the ciphertexts they receive. Stateless receivers do not necessarily update a state. Stateless schemes are preferable in the sense that receivers do not have to be continuously online to update a state. However, stateful schemes open new avenues to achieve permanent revocation by basing decryption on the state and not enabling revoked users to correctly update a state. Furthermore, broadcast models in which the receivers can open a two-way channel to the broadcaster are becoming more prevalent, e.g. IPTV and Over-The-Top broadcasting. Given such two-way channels, receivers can update their state even if they go offline for a time.

A trivial solution for constructing collusion resistant broadcast system works as follows: The broadcaster maintains n independent encryption keys, while each user is granted his/her personal decryption key. The broadcaster encrypts each message with all of the encryption keys. Each user maintains a single private key, and decrypts a message by his/her private key. Since the keys are independent, collusion resistance is satisfied for any number of revoked colluding users. Obviously, this scheme is not efficient in the number of encryption/decryption keys, size of broadcaster storage, and cost of encryption/decryption procedure.

Protocols for stateful receivers have been introduced and analyzed in [10], [15], [3], [4], [18], and [16]. Most of the stateful symmetric encryption schemes are based on graph theory constructions, and support permanent revocation of a single user or a group of users. The protocols of [14] and [11] are based on the graph theoretic approach and provide permanent revocation of a single user or a group of users. The scheme of [11], based on the Layered Subset Difference technique, improves the results of [14], and shows that for any $\epsilon > 0$ one can create an efficient broadcast scheme (that supports users' revocation) with $O(\log^{1+\epsilon} n)$ keys, $O(r)$ messages, and $O(\log n)$ cryptographic operations. Here r<n denotes a number of revoked users.

The best schemes of [16] require log n keys per update, linear server (broadcaster) storage of 2n−1 keys, and logarithmic user storage of log n keys. Nevertheless, all these schemes are based on the private (symmetric) keys encryption. The drawback of this approach is that only users that have the secret key, can receive and decrypt the broadcasted messages.

The stateless broadcast encryption schemes may be based on symmetric-key or public-key approach.

Stateless Symmetric Key Schemes

The most efficient stateless symmetric scheme of [7], based on Generalized Decisional Diffie-Hellman Exponent (GDDHE) assumption (Construction 3) provides users' revocation with the symmetric encryption and decryption keys of constant size and length of ciphertexts of the order $O(r)$, where parameter r denotes the number of revoked users. The Construction 3 of [7] supports users permanent revocation.

The use of symmetric key cryptosystems restricts the solutions presented in [7] in the sense that only the server (or central module) may broadcast the sensitive data.

Stateless Public Key Schemes

The most used approach in creating collusion resistant broadcast or revocation systems is based on hardness of decisional algebraic problems in the groups of elliptic curves (for example Bilinear Decisional Diffie-Hellman (BDDH) problem). The broadcast encryption schemes for stateless receivers based on bilinear maps were proposed in [2] and further developed in [9]. The consequent constructions are compared regarding the efficiency parameters such as decryption/encryption keys and ciphertext sizes, and time complexity. Two constructions, based on bilinear maps, were introduced in [9]. In the first construction a ciphertext and private keys are of constant size, while public key length is linear in total number of receivers. The second construction achieves trade off between the ciphertext and public key length when both of them are of order $O(\sqrt{n})$ for any subset of receivers from a system of n users. The system uses constant size ciphertexts.

A powerful technique for public-key, broadcast encryption systems, is Attribute Based Encryption (ABE) (e.g., [5], [13]). The purpose of ABE is to establish access policy for decrypted data among users of a given set.

ABE was proposed in [17] as means for encrypted access control. The main idea of the ABE system is that ciphertexts are not necessarily encrypted for one particular user. Unlike traditional public-private key cryptography, user's private keys and ciphertexts are associated with a set of attributes that a user possesses. A user can decrypt a ciphertext if and only if he/she has a corresponding set of attributes associated with a security policy. In the Ciphertext Policy Attribute Based Encryption (CP-ABE) a user has to posses a certain set of attributes in order to access data.

The purpose of ABE is to establish access policy on who among the users of a given set can decrypt data. The number of keys used in ABE is logarithmic in the number of users, which provides the smallest possible number of keys ([6]). ABE ensures collusion resistance for any number of revoked colluding users. The main idea of the CP-ABE is that a user's private key is associated with (an arbitrary number of)

attributes. A user is able to decrypt a ciphertext if there is a match between his/her attributes and the access structure of the ciphertext.

The paper [6] presents the proof of the basic schemes of [5]. In addition the basic ABE scheme is optimized in [6] by introducing the hierarchical structure of the attributes. Like other ABE based revocation systems, the scheme of [5] provides only temporary revocation of users.

Efficiency of the Broadcast Encryption Scheme

Efficiency is measured in server/user storage space, computational complexity of key update procedure and a number of messages sent upon join or revocation event.

Optimal efficiency is achieved for public key with temporary revocation by [12] and for symmetric key with permanent revocation by [7]. In both works, the encryption/decryption keys are of constant size, ciphertext size is of O(r), where r is the number of revoked users, and the computational complexity of a key update procedure is O(r).

Basic Ciphertext Policy ABE (CP-ABE) techniques were introduced and analyzed in [1]. Any user in [1] is assigned a set of attributes and can decrypt any ciphertext that embeds a policy, which satisfies the user's attributes. Furthermore, any coalition of users cannot decrypt a ciphertext if none of the user's attributes satisfies the policy.

A previous broadcast encryption work [5] bases broadcast encryption on CP-ABE. However, each revocation is temporary since sequentially revoked users (identified with different sets of attributes) can share their attribute keys and reconstruct the keys updated after their revocation.

The following table summarizes the classification of Broadcast Encryption methods used in the prior art publications referenced herein that discuss the subject of revocation.

|  | Public | | Symmetric | |
| --- | --- | --- | --- | --- |
| Revocation | stateful | stateless | Stateful | stateless |
| Temporary | [2], [5], [13], [9], [12] | | | |
| Permanent | | | [10], [15], [3], [4], [18], [16], [14], 11] | [7] |

From the above table it is seen that in the prior art there does not exist a public-key encryption method that supports permanent user revocation.

Therefore it is a purpose of the present invention to provide public-key encryption method that supports permanent user revocation.

It is another purpose of the present invention to extend known Ciphertext Policy ABE (CP-ABE) techniques to support permanent revocation.

It is another purpose of the present invention to provide a method for transforming public key broadcasting encryption methods with temporary revocation into methods with similar efficiency and permanent revocation.

Further purposes and advantages of this invention will appear as the description proceeds.

SUMMARY OF THE INVENTION

The invention is a method for broadcast encryption that allows a broadcaster to send encrypted data to a set of users such that only a subset of authorized users can decrypt the data. The method supports permanent revocation of users and comprises the following modifications to the four stages of the basic Cipher-text Policy Attribute-Based Encryption techniques:

a) in the setup stage—a random control component is added by the broadcaster to the master key;
b) in the key generation stage—the broadcaster sends to each user a private key that includes the attributes of the user and a component that includes the state of the user, wherein the state of the user is a function of the random control component;
c) in the encrypt stage: the broadcaster constructs a ciphertext by use of an algorithm that includes a global secret key, wherein the global secret key is encrypted by the private keys of the subset of authorized users; and
d) in the decrypt stage: the broadcaster sends the ciphertext which encrypts the global secret key to the authorized users, whereupon only users in the subset of authorized users are able to decrypt and use the global secret key.

If one or more users is admitted to or revoked from the subset of authorized users, thereby forming a new subset of authorized users the method proceeds as follows:

a) the broadcaster updates the random control component to a new random control component; thereby,
b) changing the master key and the state of each user and their private keys; thereby,
c) changing the global secret key to a new global secret key, which is encrypted by the private keys of the new subset of authorized users; thereby,
d) only allowing users in the new subset of authorized users to decrypt ciphertext that has been encrypted by the broadcaster using an algorithm that includes the new global secret key; and therefore,
e) only allowing users in the new subset of authorized users to use the new global secret key.

Embodiments of the method of the invention are adapted to transform any Attribute-Based Encryption scheme that supports only temporary revocation into a scheme that supports the permanent revocation of users.

DETAILED DESCRIPTION OF EMBODIMENTS OF THE INVENTION

The invention is a new and efficient method for broadcast encryption. A broadcast encryption method allows a broadcaster to send an encrypted message to a dynamically chosen subset RS, |RS|=n of a given set of users, such that only users in this subset can decrypt the message. An important component of broadcast encryption methods is revocation of users by the broadcaster, thereby updating the subset RS. Revocation may be either temporary, for a specific ciphertext, or permanent.

The invention is a public key broadcast encryption method that supports permanent revocation of users. The method of the invention is fully collusion-resistant. In other words, even if all the users in the network collude with a revoked user, the revoked user cannot encrypt messages without receiving new keys from the broadcaster. The procedure is based on basic Cipher-text Policy Attribute-Based Encryption (CP-ABE) techniques introduced and analyzed in [1].

The overhead of the method of the invention is O(log n) in all major performance measures including length of private and public keys, computational complexity, user's storage space, and computational complexity of encryption and decryption.

The method of the invention allows the generic transformation of any CP-ABE based broadcast encryption scheme (all of which provide only temporary revocation) into a scheme with permanent revocation.

A prior art broadcast encryption work [5] bases broadcast encryption on CP-ABE. However, each revocation is temporary since sequentially revoked users (identified with different sets of attributes) can share their attribute keys and reconstruct the keys updated after their revocation. The present invention eliminates this problem in such a way that any revoked user/users cannot decrypt any ciphertext broadcast after the revocation. Moreover, the collusion of all users from the new set of broadcast receivers cannot help in this attempt.

The main advantages of the method of the invention are:
an efficient public-key encryption scheme that supports permanent users' revocation. The identities of the revoked users are permanently excluded (upon key update procedure) from the encryption mechanism. Prior art methods that enabled permanent revocation are all based on symmetric keys: e.g., scheme 3 of [7] and [14]. The use of public encryption systems allows any user (not only a broadcaster) to encrypt and broadcast a message.
By providing permanent users' revocation, the present invention treats the more complex notion of collusion when a previously revoked user Ui can get private information (including secret keys) from a later revoked user Uj (or set of such revoked users). Hence, the method of the invention copes with stronger adversary, compared with the previous public key schemes e.g., [2], [5]. The penalty paid by the present invention is that the method is stateful and hence all the participating users must be permanently on-line (or updated about the sessions they missed).
There is no change in the public key upon executing the Join procedure, and Join may be efficiently implemented in O(log n) time complexity. It should be noted that the best prior art implementation is introduced in [7] that requires O(1) time complexity. The present invention uses an efficient key update based on the basic CP-ABE techniques that is executed by the server (broadcaster).
The efficiency of the method of the invention is worse by at most a factor of O(log n) from the most efficient public key scheme [12], which only achieves temporary revocation. Efficiency is measured in the length of private and public keys, length of a ciphertext and computational complexity of a decryption/key update procedure. The permanent revocation achieved by the method of the invention requires a public key of length O(1), private keys of length O(log n) and the ciphertext length to revoke r users is O(r log n). The computational complexity of a key update is also O(r log n).

The method of the invention uses basic CP-ABE [1] in a way that supports users' permanent revocation. The main idea is to change the state of each non revoked user by updating the master key MK and the secret key SKi of each user in a way that all the users except the revoked user Uj can decrypt the ciphertext and no coalition of users that record the messages after the exclusion of Uj can assist in updating SKj and computing the new secret master key.

The method of the invention proceeds as follows:
Each user is defined by a unique combination of attributes, e.g. the bits in a binary representation of the user's ID, or any other equivalent representation. Each user receives from the broadcaster attribute (private) keys that enable sending a public-key encrypted message to be decrypted by any subset of users, see [5] for details. The broadcaster authorizes a subset of receivers RS by broadcasting the global secret key Control Word (CW). This key is encrypted by the appropriate attribute keys for RS (according to the ABE system). The broadcaster may then encrypt bulk data using CW.

Each user from the receiver set RS maintains the state $State_i$ that is defined as a value of a certain one-way function over a secret counter variable CTR: $State_i=f_i(CTR)$.

When a user Uj is revoked from the receivers set RS, the broadcaster updates the counter variable CTR to a new secret value $\tilde{C}TR$, and broadcasts its encrypted value to all non revoked users. As a result, the state of each user Ui, $Ui \in RS-\{Uj\}$ is updated to $State_i=f_i(\tilde{C}TR)$. Thus, the encryption key and ciphertext generated by the broadcaster, and appropriate global secret key CW are updated.

Each joined user receives fresh previously unused attribute keys from the broadcaster.

The broadcaster initiated Setup procedure, which is, in essence, the random algorithm that involves a random string. Due to the randomization, performed during Setup, a user who was previously revoked who rejoins after the revocation gets completely new attribute keys. These keys may be the attribute keys corresponding to the same (before revocation and after join) access structure. This update is performed in such a way that even a coalition of all users from the new set of receivers RS cannot collude in order to reveal the updates after Uj's revocation $State_j=f_j(\tilde{C}TR)$.

Referring to the basic CP-ABE system construction described in [1]: Let $G_0$ be a bilinear group of prime order p, let g be a random generator of $G_0$, and let e: $G_0 \times G_0 \rightarrow +G_1$ be a proper bilinear map. The security parameter k denotes the size of the groups. Let M be a secret message that should be encrypted and sent by the broadcaster to the users from the set $RS-\{U_j\}$; where, in the context of the present invention, M may be the CW.

The order of the performed actions is as follows:
Firstly, the broadcaster runs the Setup algorithm that generates the public key PK and the master key MK.
Next, the Key generation procedure outputs the attribute secret keys for the set of attributes that identifies the corresponding access structure T. The attribute secret key SK is unique for each user (from the receiver set RS) whose attributes satisfy T. In essence, the encryption of a message (CW in the present case) is a certain one way function of the set of attributes and a user. The uniqueness of the SK for each user is satisfied by the randomness that the broadcaster inserts in the secret key for each user during the Key generation procedure, and the random updating of SK by each user upon a revocation event that changes the access structure.
Finally, the broadcaster uses the attribute secret keys of the users to encrypt a message M/CW) via the Encrypt procedure. The constructed ciphertext is, in essence, a certain one way function of the attributes which satisfy a given access structure T for a given receiver set RS. It should be noted that ciphertext CT is unique for each user from RS, and it does not depend on a specific user.

The present invention comprises the following modifications of the basic scheme of [1]:
Setup: Choose $G_0$, g, and two random elements $\alpha$, $\beta \in Zp$. The public key is published exactly as in [1]: $PK=G_0$, g, $h=g^\beta$, $e(g, g)^\alpha$. The master key MK includes the new random component $CTR \in Z_p$: $MK=\beta$, $g^\alpha$, CTR.

Key generation (MK, S): The input of the algorithm is a set of attributes S, and the output is a secret key that identifies the set. Two random numbers $r_i$ and $r_{ij}$ are chosen from $Z_p$ for each user $U_i$ and each attribute $j \in S$ respectively. The component $E_i$ encodes the state of $U_i$, which is a function of CTR. It should be noted that the users maintain distinct states. The private key of $U_i$ is:

$$\left\{ \begin{array}{ll} D = g^{\frac{a+r_i}{\beta}}, & E_i = e(g,g)^{r_i \cdot CTR}, \\ \forall j \in S: D_j = g^{r_i} H(j)^{r_{ij}}, & D'_j = g^{r_{ij}} \end{array} \right\}$$

Encrypt. The encryption procedure encrypts a message M/CW under the access structure (AS) T=RS−{Uj} (see [1] and [5] for a simplification of AS). For each node x (including the leaves) a polynomial $q_x$ is properly defined (see [1] for the encryption details). Starting with the root node R, a random secret for sharing $s \in Z_p$ is chosen and the root polynomial is defined in 0 as $q_R(0)=s$. It should be noted that the secret s and its corresponding shares are changed (decremented by CTR) in the modification of the invention.

Set $s_2 = -s - CTR \mod p$ and construct the ciphertext CT as:

$CT = (T = RS - \{U_j\}, \tilde{C} = Me(g,g)^{\alpha s_2}$ $C = h^{s_2}, \forall y \in Y: C_y = g^{q_y(0)},$ $C_y' = H(j)^{q_y(0)}$ Here Y denotes the set of leaf nodes in T and H is a cryptographic proper hash function.

Decryption: The decryption procedure performed by each user that possess a set of attributes corresponding to T is as follows: First, the user computes $A_i = e(g,g)^{r_i s}$ by using the DecryptNode procedure of [1]. Then, $M = \tilde{C}/(e(C,D) \cdot A_i \cdot E_i)$ since $$e(C, D) = e\left(g^{\beta s_2}, g^{\frac{a+r_i}{\beta}}\right) = e(g, g)^{(a+r_i)s_2} =$$
$$e(g, g)^{\alpha s_2} \cdot e(g, g)^{r_i s_2} = e(g, g)^{\alpha s_2} \cdot e(g, g)^{r_i(-s-CTR)}.$$

Hence, $e(C,D) \cdot E_i = e(g,g)^{\alpha s_2} \cdot e(g,g)^{-r_i s}.$

As a result, $e(C,D) \cdot E_i \cdot A_i = e(g,g)^{\alpha s_2}.$

Finally, $M = \tilde{C}/(e(C,D) \cdot A_i \cdot E_i)$

The broadcaster updates CTR in MK by CTR←CTR+s mod p. The user updates $E_i$ in its private key by $E_i \leftarrow E_i \cdot A_i = e(g,g)^{r_i CTR} e(g,g)^{r_i s} = e(g,g)^{r_i(CTR+s)}.$ Unlike previous CP-ABE based schemes, e.g. [5], the users' attribute keys in the method of the invention remain constant regardless of the possible revocations, whereas only a global state CTR and corresponding functions of CTR are updated.

Once a user $U_j$ is revoked, it cannot compute its function of CTR, $e(g,g)^{r_j \cdot CTR}$ even with the collusion of every other user. Thus, the revocation is permanent.

The generic procedure for transformation from any ABE based scheme (with temporary revocation only) into a scheme that supports the permanent revocation of users, is based on the following observations: Each non-revoked user posses a state, which is changed upon revocation of a certain user or a group of users. The change of a state of any non revoked user is performed by updating the secret master key MK by the broadcaster, and corresponding updating the secret key $SK_i$ of each non-revoked user $U_i$ (based on $U_i$-th state). As a result of this procedure, all users except the revoked $U_j$ can decrypt the ciphertext and no coalition of users (that record the messages after the exclusion of Uj) can assist in updating $SK_j$ and computing the new secret master key MK.

The generic scheme for integration of the permanent revocation into any ABE based scheme includes the following steps into the above described encryption procedure:

Setup: This algorithm chooses a bilinear group $G_0$ of prime order p, a proper bilinear map e: $G_0 \times G_0 \rightarrow G_1$, a random generator g (or generators g and h), and random exponents a, $b \in Z_p$ (see [2], [5], [12]). The output of Setup is the public key PK. PK securely encapsulates the random secrets a and b. In all schemes with temporary revocation the secret master key MK includes the random secrets used for the PK generation. For example, MK=(b, $g^a$) in [2] and [5] and MK=(a, b) in [12]. In order to perform generic transformation from temporary to permanent revocation, the additional secret random component CTR is added to MK. The encoding of a user's state is based on the new counter variable CTR.

Key generation (MK, S): The key generation algorithm takes as input a set S of predefined attributes, and outputs a secret SK, known to all nonrevoked users, i.e. users that posses the attributes set S. It should be noted that S may be defined differently, based on the considerations of the network management system. In order to construct a scheme with permanent users' revocation, the state encoding component of each user Ui Ei is included into SK. Ei securely encapsulates the state variable CTR for each user Ui. Due to the randomness used for the generating of Ei, the non-revoked users that possess the same attribute set S have distinct states. $Ei = e(g,g)^{r_i CTR}$ in the generic scheme of the invention applied to the schemes of [2] and [5], and $E_i = e(g,g)^{b^{t_i} t_i CTR}$ in [12]. Here ri and ti are randomly chosen by each user in [2, [5], and [12], respectively.

Encrypt: The input of this algorithm is the public key PK, a message $M \in G_1$, and a corresponding access structure AS. The output of the Encrypt procedure is a ciphertext CT. According to the modification of the invention, the secret s shared between the non-revoked users, is updated upon a revocation event as $s_2 = -s - CTR$. The general encryption procedure of [2], [5], and [12] is not modified. The main point of the modification of the invention is that a new secret value (modified by a broadcaster) is shared between the non-revoked users from the updated set of attributes S.

Decrypt: After the decryption, performed by each user (who possess a set of attributes corresponding to the AS T), the broadcaster updates CTR in MK by CTR←CTR+s mod p. As a result, each user updates Ei in its private key. Due to the random exponent generated by a user in the independent way, the state, encoded by Ei, is distinct for all users.

Once a user Uj is revoked, he/she cannot compute their function of CTR, even with the collusion of every other user. Thus, the revocation is permanent.

The most efficient ABE based encryption method presently available is that of A. Lewko and A. Sahai [12]. There follows a description of how the method of the invention can be incorporated into this prior art method to convert it into a method with permanent revocation.

Setup: the Setup is performed as in the basic scheme of [12] without modifications. The proper group $G_0$ of a prime order p, two random generators g, h$\in G_0$, and two random secret numbers a, b$\in Z_p$ are chosen.

The bilinear transformation e is defined as in [12]. The public key is published as PK=(g, $g^b$, $g^{b^2}$, $h^b$, $e(g,g)^a$). The secret master key of the broadcaster MK includes the new random component CTR$\in Z_p$: MK=(a, b, CTR).

Key generation: The key generation algorithm chooses a random $t_i \in Z_p$ (as in [12]) and publishes the secret private key (that identifies the set of the corresponding attributes) as $$SK=(D_0=g^a g^{b^2 t_i}; D_1=(g^{b ID_i} h)^{t_i},$$

$$D_2=g^{-t_i}; E_i=e(g,g)^{CTR \cdot b^2 t_i})$$

Encrypt: As it was mentioned above, the component $E_i$ encodes the state of each user from RS, which is a function of CTR. Here ID denotes the identity of the non-revoked user. The encryption procedure is modified in the following way. As in [12], the encryption algorithm first picks a random secret s$\in Z_p$. It should be mentioned that s will be updated by the broadcaster upon user's (or users') revocation. As in [12], s is split into t shares as $s=s^{(1)}+\ldots s^{(r)}$. Let $ID^i$ denotes the i-th identity in the revocation set R={$ID_1, \ldots, ID_r$} of r revoked users. Upon the revocation of r determined above users, the broadcaster updates secret s as $s_2=s+CTR$ mod p and splits $s_2$ as $s_2=s_2^{(1)}+\ldots s_2^{(r)}$. The constructed ciphertext CT has the following structure:

$$CT=(\tilde{C}=e(g,g)^{as}M, C_0=g^{s2},$$

$$\forall i=1,\ldots,r C_{i,1}=g^{bs2^i},$$

$$C_{i,2}=(g^{b^2 ID_i} h^b)^{s2^i}).$$

Decryption: The decryption, provided by each non-revoked user Ui is performed as in [12]. The major difference is that the secret s is updated (by adding the CTR variable) per each revocation event. The computation is correctly defined $\forall_i$ ID$\neq$ID$_i$.

$$\frac{e(C_0, D_0)}{e\left(D_1, \prod_{i=1}^r C_{i,1}^{1/(ID-ID_i)}\right) \cdot e\left(D_2, \prod_{i=1}^r C_{i,2}^{1/(ID-ID_i)}\right)} =$$

$$\frac{e(g^{s2}, g^a g^{b^2 t})}{e(g,g)^{b^2 t}} = \frac{e(g^{s+CTR}, g^a g^{b^2 t})}{e(g,g)^{b^2 t}} =$$

$$\frac{e(g,g)^{(s+CTR)a} \cdot e(g,g)^{(s+CTR)b^2 t}}{e(g,g)^{b^2 t}} = e(g,g)^{(s+CTR)a} \cdot e(g,g)^{CTR \cdot b^2 t}$$

The product $e(D_1, \prod_{i=1}^r C_{i,1}^{1/(ID-ID_i)}) \cdot e(D_2, \prod_{i=1}^r C_{i,2}^{1/(ID-ID_i)})$ is equal to $A=e(g,g)^{b^2 t}$ and it is computed by each non-revoked user (defined by the identity ID). As a result of the decryption procedure, the entire secret message M is revealed as follows:

$$M = \frac{\tilde{C} \cdot E_i \cdot A}{e(C_0, D_0)}.$$

The broadcaster updates CTR in MK by CTR$\leftarrow$CTR+s mod p. The user updates Ei in its private key by $$E_i \leftarrow E_i \cdot A_i = e(g,g)_i^{CTR \cdot b^2 t} e(g,g)_i^{s \cdot b^2 t} = e(g,g)^{(CTR+s)b^2 t}.$$

As in the scheme presented hereinabove, any revoked user, say $U_j$, cannot compute its function of CTR, $e(g,g)^{CTR b^2 t}$. Hence, the revocation is permanent.

Although embodiments of the invention have been described by way of illustration, it will be understood that the invention may be carried out with many variations, modifications, and adaptations, without exceeding the scope of the claims.

BIBLIOGRAPHY

1. J. Bethencourt, A. Sahai, B. Waters, "Ciphertext-Policy Attribute Based Encryption", *IEEE Symposium on Security and Privacy* (SP '07), pp. 321-334, 2007.
2. D. Boneh, C. Gentry, B. Waters, "Collusion Resistant Broadcast Encryption With Short Ciphertexts and Private Keys", 25-*th Annual International Cryptology Conference CRYPTO* 2005, USA, 2005. In *Lecture Notes in Computer Science*, volume 3621, pp. 258-275.
3. R. Canetti, J. Garay, G. Itkis, D. Micciancio, M. Naor, B. Pinkas, "Multicast Security: A Taxonomy and Some Efficient Constructions", *INFOCOM '99*, Eighteenth Annual Joint Conference of the IEEE Computer and Communications Societies, Proceedings, volume 2, pp. 708-716, 1999.
4. R. Canetti, T. Malkin, K. Nissim, "Efficient Communication-Storage Tradeoffs for Multicast Encryption", *EUROCRYPT'99, LNCS*1592, pp. 459-474, 1999.
5. L. Cheung, J. A. Cooley, R. Khazan, C. Newport, "Collusion Resistant Group Key Management Using Attribute Based Encryption", *Cryptology ePrint Archive*, Report 2007/161, 2007. Presented at GOCP 07.
6. L. Cheung, C. Newport, "Provably Secure Ciphertext Policy ABE", *Proceedings of the 14th ACM conference on Computer and communications security* (CCS), pp. 456-465, 2007.
7. C. Delerablee, P. Paillier, D. Pointcheval, "Fully Collusion Secure Dynamic Broadcast Encryption with Constant-Size Ciphertexts or Decryption Keys", *Proceedings of the first International Conference on Pairing-based Cryptography*, LNCS 4575, pp. 39-59, Springer-Verlag, July 2007, Tokyo, Japan.
8. A. Fiat, M. Naor, "Broadcast Encryption". In Douglas R. Stinson, editor, CRYPTO'93, volume 773 of *LNCS*, pp. 480-491, CA, USA, 1994. Springer-Verlag, Berlin, Germany.
9. C. Gentry, B. Waters, "Adaptive Security in Broadcast Encryption Systems", In *Eurocrypt,* 2009.
10. H. Harney, E. Harder, "Logical Tree Hierarchy Protocol", *Internet Draft, Internet Engineering Task Force*, April, 1999.
11. D. Halevy, A. Shamir, "The LSD Broadcast Encryption Scheme", *CRYPTO* 2002, LNCS 2442, pp. 47-60, 2002.
12. A. Lewko, A. Sahai, B. Waters, "Revocation Systems with Very Small Private Keys", In *Security and Privacy,* 2010.

13. D. Lubicz, T. Sirvent, "Attribute-Based Broadcast Encryption Scheme Made Efficient", In *AFRICACRYPT, LNCS*, volume 5023, pp. 342-325, 2008.
14. D. Naor, M. Naor, J. Lotspiech, "Revocation and Tracing Schemes for Stateless Receivers", *CRYPTO* 2001, LNCS, vol. 2139, pp. 41-62, 2001.
15. A. Perrig, D. Song, J. D. Tygar, "ELK, a New protocol for Efficient Large-Group Key Distribution", *IEEE Symposium on Security and Privacy* 2001, Proceedings, pp. 247-262, 2001.
16. A. T. Sherman, D. A. McGrew, "Key Establishment in Large Dynamic Groups using One-Way Function Trees", *IEEE Transactions on Software Engineering*, no. 29, volume 5, pp. 444-458, 2003.
17. A. Sahai, B. Waters, "Fuzzy Identity Based Encryption", *Advances in Cryptology-Eurocrypt*, volume LNCS 3494, pp. 457-473, Springer, 2005.
18. C. K. Wong, M. Gouda, S. Lam, "Secure Group Communications Using Key Graphs", IEEE/ACM *Transactions on Networking*, volume 8, no. 1, February, 2000.

The invention claimed is:

1. A method of modifying the four stages of the Cipher-text Policy Attribute-Based Encryption (CP-ABE) method that allows a broadcaster to send encrypted data to a set of users such that only a subset of authorized users can decrypt the data, wherein the method supports permanent revocation of users;
the modified CP-ABE method comprising:
a) in the setup stage—the broadcaster adds a secret random component $CTR \in Z_p$ to random secrets $\alpha, \beta \in Z_p$ included in a master key MK, which is used to produce a public key PK;
b) in the key generation stage—a component $E_i = e(g,g)^{r_i \cdot CTR}$, which securely encapsulates the random control component CTR, is added to a set of attributes of a user that encodes the state of each user $U_i$ to generate the secret private key SK that the broadcaster sends to $U_i$, wherein g is a random generator of a bilinear group $G_0$ of prime order p, e: $G_0 \times G_0 \rightarrow G_1$ is a proper bilinear map, $r_i$ is a random number chosen from $Z_p$ is a different random integer for each user, and $CTR \in Z_p$ is the global state;
c) in the encrypt stage: the broadcaster uses an algorithm that includes a random secret for sharing $s \in Z_p$ to construct a ciphertext, the global secret key is encrypted by the private keys of the subset of authorized users, the broadcaster updates the global state by $$CTR = CTR + s$$

and the broadcaster updates s upon a revocation event as $$s_2 = s - CTR \bmod p$$

and shares $s_2$ with non-revoked users from an updated set of attributes; and
d) in the decrypt stage: user i computes a parameter $$A_i = e(g,g)^{r_i s}$$

and then user i updates its local state by $$E_i = E_i \cdot A_i = e(g,g)^{r_i \cdot CTR} \cdot e(g,g)^{r_i s} = e(g,g)^{r_i(CTR+s)}.$$

2. The method of claim 1 in which, if one or more users is admitted to or revoked from the subset of authorized users, thereby forming a new subset of authorized users:
a) the broadcaster updates the random control component to a new random control component; thereby,
b) changing the master key and the state of each user and their private keys; thereby,
c) changing the global secret key to a new global secret key, which is encrypted by the private keys of said new subset of authorized users; thereby,
d) only allowing users in said new subset of authorized users to decrypt ciphertext that has been encrypted by said broadcaster using an algorithm that includes said new global secret key; and therefore,
e) only allowing users in said new subset of authorized users to use said new global secret key.

* * * * *